United States Patent [19]

Carlson, Jr. et al.

[11] Patent Number: 5,071,672

[45] Date of Patent: Dec. 10, 1991

[54] GIRTH WELD HEATING AND COATING METHOD

[75] Inventors: Ronald E. Carlson, Jr., Catoosa, Okla.; David Paulley, Bletchley, England

[73] Assignee: Commercial Resins Company, Tulsa, Okla.

[21] Appl. No.: 529,636

[22] Filed: May 29, 1990

[51] Int. Cl.$^5$ .............................................. B05D 3/02
[52] U.S. Cl. .................................... 427/46; 427/197; 427/202; 427/319; 427/383.3; 427/386; 427/405; 427/410
[58] Field of Search .................. 427/46, 319, 383.3, 427/386, 405, 410, 197, 202

Primary Examiner—Bernard Pianalto
Attorney, Agent, or Firm—William S. Dorman

[57] ABSTRACT

A process for heating and coating a weld joint in a pipe comprising placing an open heating and coating ring on the pipe over the center of the weld joint; the heating and coating ring being an articulated yoke adapted to encircle the pipe when the ring is in the closed position and comprising an upper yoke section and two side yoke sections which pivot with respect to the upper yoke section, a pair of releasable locking devices mounted on the upper yoke section for engaging the side yoke sections when the latter are pivoted outwardly away from each other to an open position of the ring thereby locking the side yoke sections in the open position; the upper yoke section having a powder dispensing system mounted thereon for later dispensing a powdered coating material therefrom onto the surface of the pipe; each side yoke section having an induction heating assembly mounted thereon, each induction heater assembly including an induction coil comprising a length of hollow copper tubing wound in an elliptical pattern a multiplicity of times, each said coil being bowed correspondingly to the curvature of said pipe.

1 Claim, 6 Drawing Sheets

GIRTH WELD HEATING AND COATING METHOD

BACKGROUND OF THE INVENTION

1. Field of the Invention

The present invention relates to a system for coating weld joints in a pipeline. More particularly, the present invention relates to an assembly and process for heating a weld joint and thereafter applying a coating to the heated weld joint.

2. Prior Art

Various methods and systems are used to cover the weld joints of a pipeline which has been made up from pipe sections welded together in end-to-end relation. These pipe sections have been previously coated at the mill, except for the ends, which as indicated above, are welded together in the field. The pipe joints are then protected from corrosion by coating them in the field with an epoxy material, or with a polyethylene material, or by covering these weld joints with asphalt sleeves or heat-shrinkable polyethylene sleeves.

In Hart U.S. Pat. No. 4,308,819, issued on Jan. 5, 1982 and entitled "System for Spraying Fludized Powder Circumferentially Around a Pipe Joint" there is disclosed a powder applicator ring which is comprised of three arcuate frame members which connect together by a latching means to circumferentially engage a pipe around a weld joint. The ring is capable of moving circumferentially around the pipe by means of belts which engage the surface of the pipe. Powder dispensers are mounted on the ring and are adapted to spray powder onto the weld joint which has been previously heated by a separate apparatus.

In Betteridge et al U.S. Pat. No. 4,595,607, issued on June 17, 1986 and entitled "Combined Induction Heating and Coating System for Pipe Weld Joints" there is disclosed a ring which is divided into three arcuate sections that encircle the pipe and which are adapted to move circumferentially around the weld joint by means of a plurality of belts or wheels which engage the surface of the pipe. In the Betteridge et al patent, the powder dispensers are also mounted on the ring as in the case of the Hart patent referred to above. However, the Betteridge et al patent has a plurality of induction heaters mounted in the ring for heating the weld joint prior to the application of the powdered material.

In Hart et al U.S. patent application Ser. No. 07/415,518 filed Oct. 2, 1989, assigned to the owner of the present invention, and entitled "Sleeve Applicator Assembly for Pipe Joints", there is shown a stationary frame which is attached to a pipe adjacent a weld joint. A ring composed of two arcuate elements which can be connected together to form a closure is positioned adjacent the frame for rotation around the weld joint. Drive means mounted on the stationary frame engages the ring to rotate the latter around the weld joint. The aforementioned ring of the Hart et al application is designed to apply a sheet of shrinkable material to the weld joint. The ring also includes a pair of spaced induction heating means which are similar to the heating means to be disclosed in the present invention.

SUMMARY OF THE INVENTION

The present invention provides a system for first heating and then coating the weld joints of a pipe which has been made up from pipe sections welded together in end-to-end relation. These pipe sections have been previously coated at the mill, except for the ends, which as indicated above, are welded together in the field. The apparatus of the present invention includes an articulated ring or yoke which is adapted to encircle a pipe or pipeline over the area of a weld joint. The yoke itself consists of an upper yoke section and two side yoke sections which pivot or swing with respect to the upper yoke section. The two side yoke sections can be locked together at the bottom to complete the closure of the yoke around the pipe. A plurality of wheels are mounted on the sides of the yoke so that that apparatus can be rotated 360° in either direction for a purpose which will hereinafter appear.

Mounted on each side yoke section is an induction heating unit. Each induction heating unit includes an elliptically wound copper coil which is disposed longitudinally parallel to the pipe and which is bowed to match the curvature thereof. The coils which form the induction heaters are hollow so that water can pass through thereby cooling them. An electrical current is allowed to pass through the coils which are sufficiently electrically insulated from the rest of the apparatus. As disclosed herein, and purely for the purpose of example, the power supply for the induction heaters can be a 75 KW generator operating at a frequency of 800 hertz and having an output voltage of up to 275 volts. For example, in a given case, the generator might be delivering 280 amperes at 180 volts. The frequency of the electric current is preferably about 800 cycles (or hertz) although it could be from between 1000 and 1500 hertz, for example, or any other suitable frequency. The electrical power supply for the copper coils is broadly the same as that disclosed in Hughes U.S. Pat. No. 4,388,510.

Mounted on the central or upper yoke section is a powder dispensing system which is broadly the same as that shown in Hart U.S. Pat. Nos. 4,371,295 and 4,380,819. In the present application, two powder dispensing units are shown arranged adjacent each other and radially directed inwardly towards a pipe whose weld joint is to be heated and coated. These powder dispensing units connect with suitable hoses which supply powder to and remove excess powder from the units in a manner similar to that described in the above-mentioned Hart patents. Although two powder dispensing units are shown in this application, depending upon the size of the pipe to be coated, the overall assembly could be provided with only one powder dispensing unit.

When the yoke of the present invention is properly positioned and secured around the pipeline in the area of the weld joint to be coated, the coating applicator system and the electrical induction heating system are properly energized and the yoke is powered for rotation 360° to either side of the initial position of the yoke. The operator first initiates rotation of the yoke. Immediately thereafter, electrical power is supplied to the induction coils. When the yoke has moved 360° degrees, direction of movement is reversed so it can traverse back to the original position and if desired, beyond. Thus, the yoke rotates back and forth during the heating operation. If it is desired to coat the weld joint with an epoxy material, then of course the powder suspension system is adapted to provide such an epoxy powder. Under these conditions the pipe is preferably heated to a temperature of about 450° F. which would probably take between one and one-half and five minutes, depending upon the diameter and wall thickness of the pipe. At this time the electrical power to the induction heating units is cut off and the powder dispensers are allowed to dispense epoxy powder to the pipe joint while the yoke is still rotating with respect to the pipe. The coating time would normally be between thirty seconds and a minute and one-half.

DETAILED DESCRIPTION OF THE PREFERRED EMBODIMENTS

Figure 2:
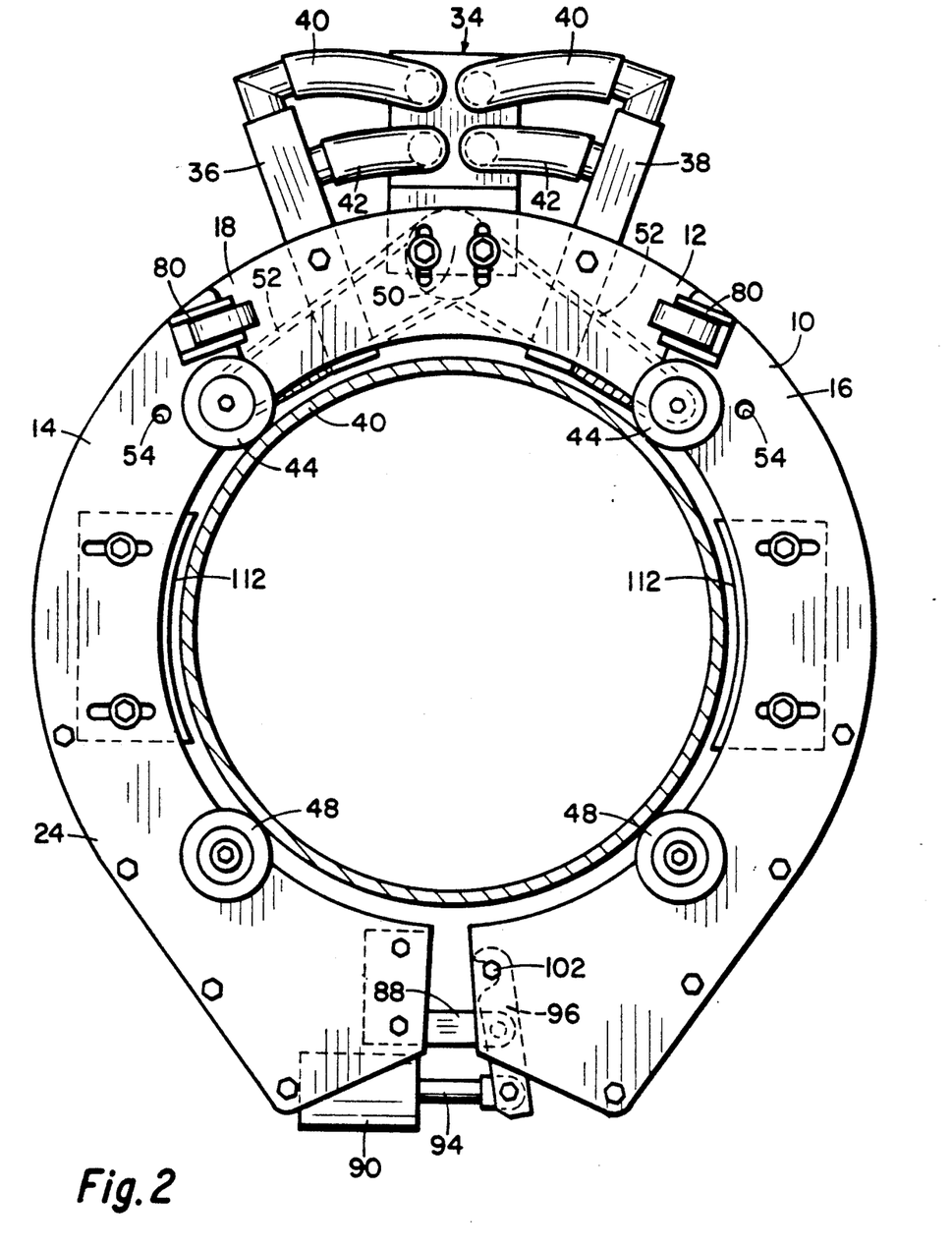
FIG. 2 is a side elevation of the apparatus shown in FIG. 1.
Figure 3:
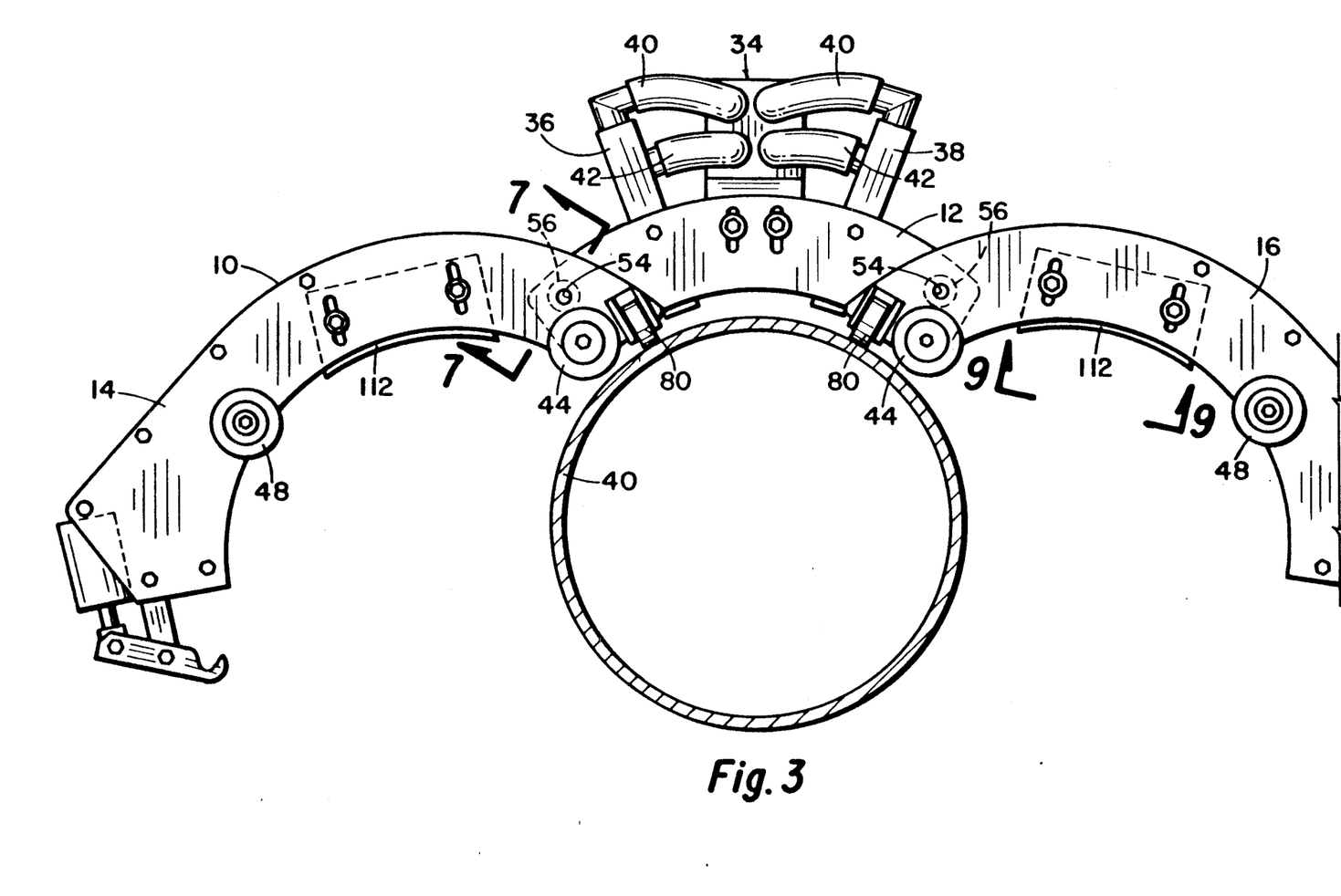
FIG. 3 is a side elevation, on slightly smaller scale than FIG. 2, showing the apparatus in open position.
Figure 4:
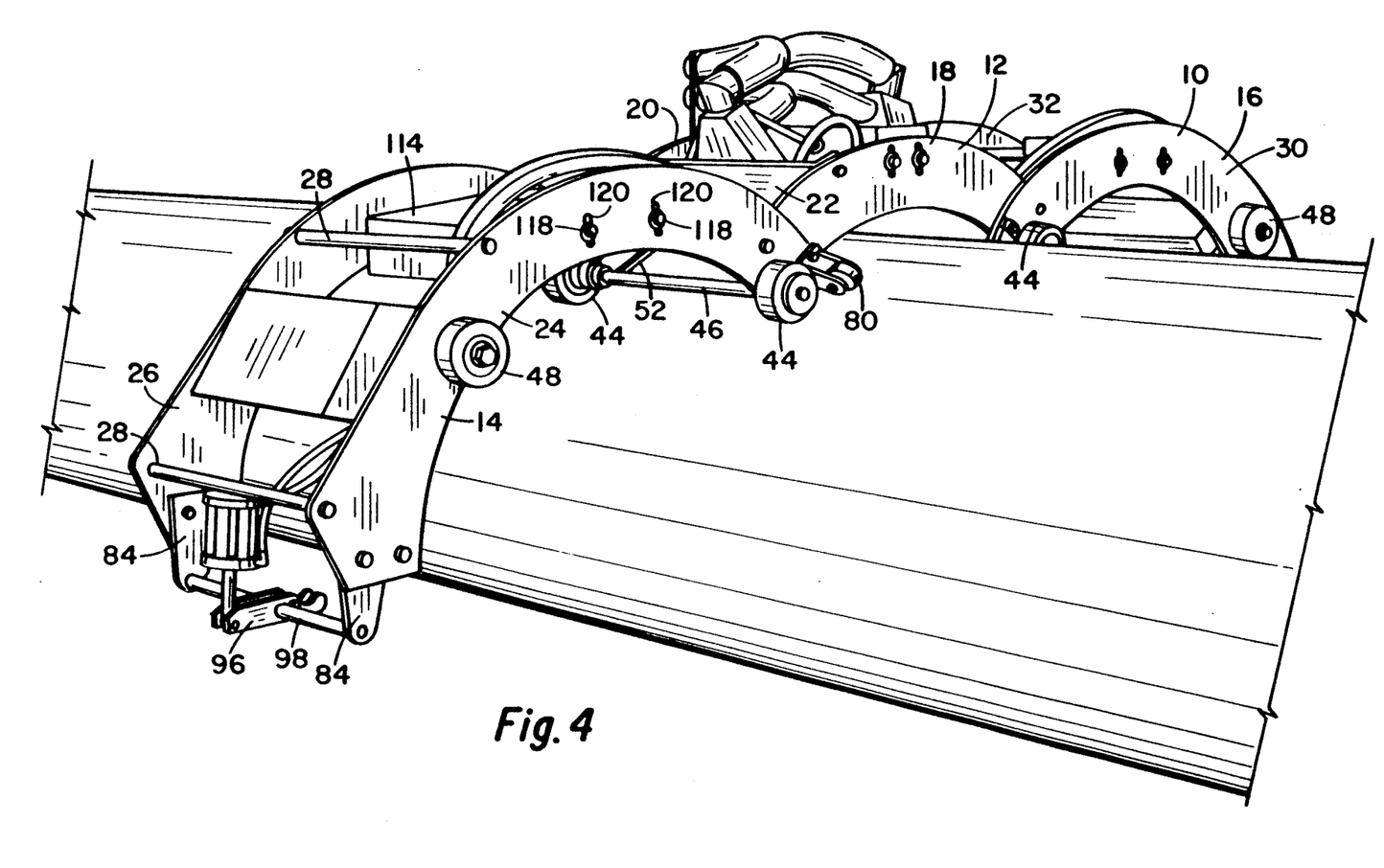
FIG. 4 is a perspective view of the apparatus shown in FIG. 3.

Referring to the drawings in detail, FIGS. 1 to 4 show a ring or yoke 10 which is similar to the ring shown in FIG. 4 of the aforementioned Hart U.S. Pat. No. 4,308,819 as well as in FIG. 4 of Hart U.S. Pat. No. 4,371,295 issued Feb. 1, 1983. This yoke or ring 10, which is essentially an aluminum frame, is divided into three arcuate sections: an upper or central section 12 and side sections 14 and 16.

Central yoke section 12 is provided with a pair of spaced, parallel and arcuate side members or plates 18 and 20 which are held in spaced parallel relation by means of a plurality of cross members 22 which are bolted at their ends to the side members 18 and 20. Likewise, side yoke section 14 is comprised of arcuate side plates 24 and 26 which are held in spaced parallel relation by means of cross members 28 which are bolted at their ends to side members 24 and 26. Side yoke section 16 is provided with a pair of spaced arcuate side plates 30 and 32 which are held in spaced parallel relation by means of a plurality of cross members similar to the cross members 28.

Yoke section 12 has mounted thereon a powder dispensing system 34 which is broadly similar to the powder dispensing system disclosed in Hart U.S. Pat. Nos. 4,371,295 and 4,380,819, referred to above. In the present application, two powder dispensing units 36 and 38 are shown arranged adjacent each other and radially directed inwardly towards a pipe 40 whose weld joint is to be heated and coated. These powder dispensing units 36 and 38 connect with suitable hoses 40 and 42 which supply powder to and remove excess powder from the units 36 and 38 in a manner similar to that described in the abovementioned Hart patents. Although two powder dispensing units 36 and 38 are shown in this application, depending upon the size of the pipe to be coated, the overall assembly could be provided with one powder dispensing unit.

Arcuate yoke section 14 is provided with a pair of driven wheels 44 which are mounted on the ends of an axle 46 which extends through the side members 24 and 26. These wheels 44 are adapted to bear against the outer surface of the pipe 40 when the device is in the closed position shown in FIG. 2, as will be explained hereinafter. Arcuate section 14 is also provided with idler wheels 48 (only one of which is shown) which likewise bear against the outer surface of the pipe when the apparatus is in the closed position. The wheels 48 are mounted on the ends of an axle (not shown) which extends through the side members of 24 and 26. Arcuate section 16 is also provided with drive wheels 44 and idler wheels 46 which are mounted on the section 16 in the same manner that wheels 44 and 48 are mounted on the section 14.

Referring now FIG. 2, a DC motor (not shown) is mounted behind the powder dispensing system 34. The drive shaft of this motor is provided with a sprocket 50 (shown in dotted lines) which connect by a chain 52 (also shown in dotted lines) to a sprocket (not shown) on the shaft 46 for the wheels 44 mounted on the arcuate section 14. Another sprocket (not shown) parallel to the sprocket 50 and driven by the shaft of the motor referred to above, connects by means of another chain 52 (also shown in dotted lines) to the shaft 46 for the wheels 44 on the arcuate section 16.

Figure 1:
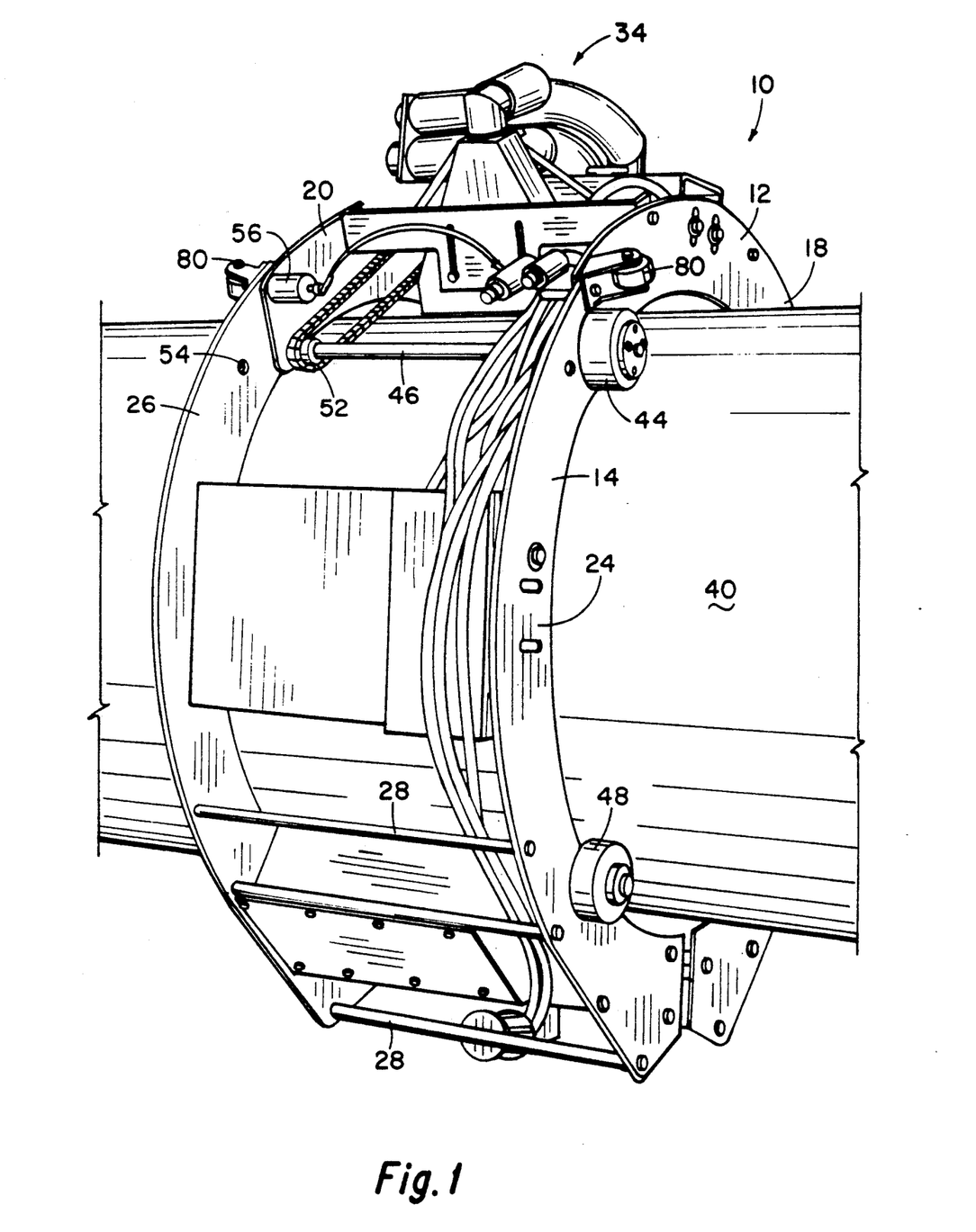
FIG. 1 is a perspective view showing the apparatus of the present invention in closed and operative condition encircling a pipe over a weld joint (not shown)

The central or upper arcuate section 12 is pivotally connected to the arcuate section 14 around the axle 46 which supports the wheels 44 for the section 14. Central section 12 is also pivotally connected to the arcuate section 16 along the axle 46 which supports the wheel 44 for the section 16. In order to hold the apparatus in the open position shown in FIGS. 2 and 3, a hole 54 is provided in the sideplate 26 of the arcuate section 14, as best shown in FIG. 1. A similar hole is provided in a corresponding position along the sideplate 32 of arcuate section 16. A locking device 56 is mounted along the arcuate sideplate 20 of the upper section 12. A similar locking device 56 (not shown) is mounted on the opposite end of the arcuate plate 20 for the section 12 so it cooperates with a similar hole 54 (not shown) located in the arcuate plate 32 for the yoke section 16. The details of the locking member 56 are shown in FIGS. 7 and 8.

Figures 6, 7, 8:
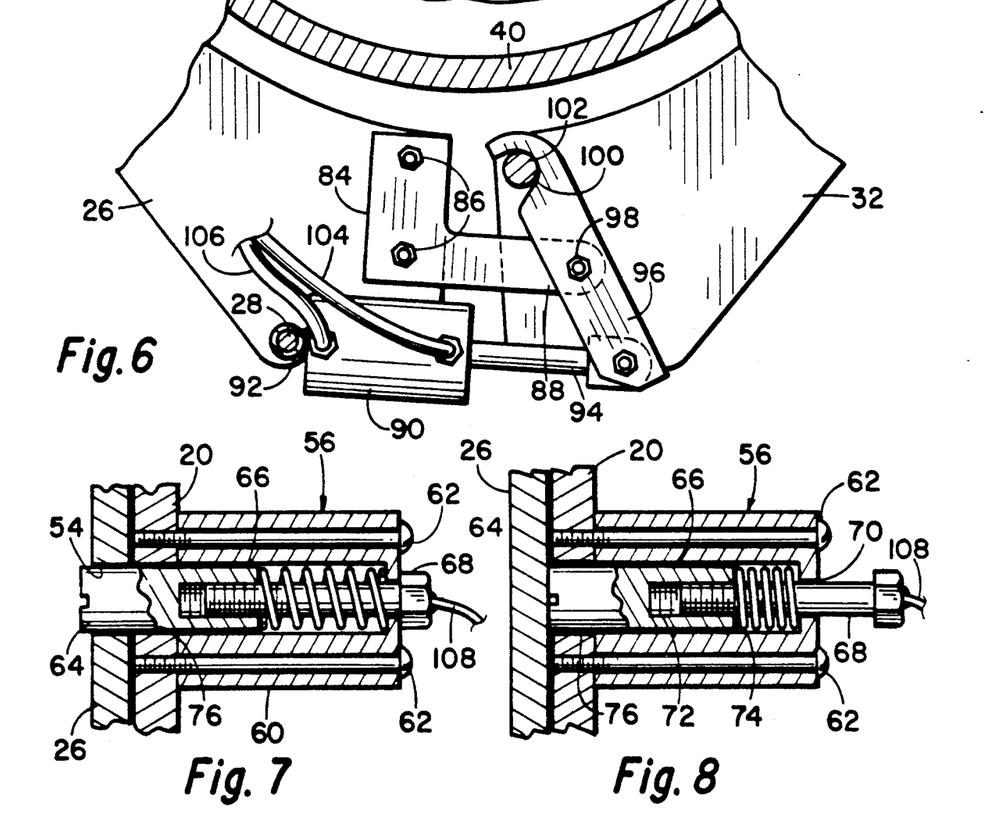
FIG. 6 is a view similar to FIG. 5 showing the latch in the fully closed position.
FIG. 7 is a sectional view taken along section line 7—7 of FIG. 3 showing the details of the locking pin for holding the ring segments in open position.
FIG. 8 is a view similar to FIG. 7 but showing the locking pin in disengaged position.

Referring now to FIGS. 7 and 8, the locking device 56 consists of a hollow cylindrical housing 60 which is attached to the inner surface of the plate 20 by means of elongated threaded screws 62. A cylindrical plunger 64 is mounted within a cylindrical cavity 66 in the housing 60. A threaded bolt 68 extends outwardly through an opening 70 in the housing 60. The inner end of the bolt extends inwardly into the cavity 66 and is threadedly received in a threaded hole 72 in the plunger 64. A coiled spring 74 is received around the bolt 68 between the inner end of the plunger 64 and the right hand end of the cavity 66. The forward or outer end of the plunger 64 is adapted to project into a hole 76 in the plate 20 of the upper arcuate section 12. The spring 74 will urge the plunger 64 towards the left (in relation to FIGS. 7 and 8) through the opening 76 in the arcuate plate 20 and against the inner side of the arcuate plate 26. When, however, the yoke section 14 is pivoted upwardly from the position shown in FIG. 1 to the position shown in FIGS. 3 and 4, the hole 54 will pass into alignment with the hole 76 and the plunger 64 will be urged immediately into the hole 54 to lock the section 16 in the position shown in FIGS. 3 and 4. Likewise, the locking device 56 (not shown) which is mounted on the side of the plate 20 adjacent plate 34 will also engage the hole 54 in the plate 32 when the section 16 is pivoted around the shaft 46 so as to lock section 16 with respect to the section 12 as shown in the FIGS. 3 and 4.

In order to roll the assembly along the pipe when the assembly is in the open position shown in FIGS. 3 and 4, sideplates 24 and 26 are provided with rollers or casters 80 which are positioned adjacent the connection of section 14 to section 12. These casters or rollers project outwardly from the section 14 and out of contact with the pipe 40 as shown in FIGS. 1 and 2. However, when the sections 14 and 16 are pivoted to the open position as shown in FIGS. 3 and 4, these casters will bear against the outer surface of the pipe 40 as best shown in FIGS. 3 and 4. Sideplates 30 and 32 of section 16 are also provided with a complementary pair of casters 80 in the same manner that section 14 is provided with these casters.

Means are provided to lock the sections together when they are in the position shown in FIGS. 1 and 2. Considering FIGS. 2, 5 and 6 sideplates 24 and 26 are each provided with an L-shaped bracket 84. The short side of the "L" of the bracket 84 is bolted to the lower ends of the plates 24 and 26 by means of bolts 86 whereas the long arm 88 of the bracket projects outwardly away from the plates 24 and 26. A pneumatic cylinder 90 is attached to one of the cross members 28 by means of a sleeve 92 which is welded to the end of the pneumatic cylinder 90 and which is received over the cross member 28. The sleeve 92 has an inner opening which is slightly larger than the outer circumference of the cross member 28 so that the pneumatic cylinder 90 can be pivoted in relation to the cross member 28. The pneumatic cylinder 90 is provided with an internal piston (not shown) and an externally extending piston rod 94 which pivotally connects at its outer end to a pivotal latch member 96. The latch 96 is pivotally connected to the outer end of the arm by means of a shaft or rod 98 which passes midway through the latch 96 and the ends of the arm 88. The upper end of the latch 96 is provided with a curved recess 100 forming a hook. A rod 102 extends across the lower ends of the sideplates 30 and 32 of the yoke section 16. The shaft 98 connects at its ends to the brackets 84 and passes through the center of the latch 96. In order to actuate the cylinder 90, a pair of air hoses or lines 104 and 106 are connected to the cylinder 90 for reciprocation of the rod 94. When the pressure is supplied to the hose 104, the piston 94 is in its fully retracted position. Conversely, when pressure is supplied to the line 106, the rod 94 can be extended so as to pivot the latch 96 around the rod 98.

Figure 5:
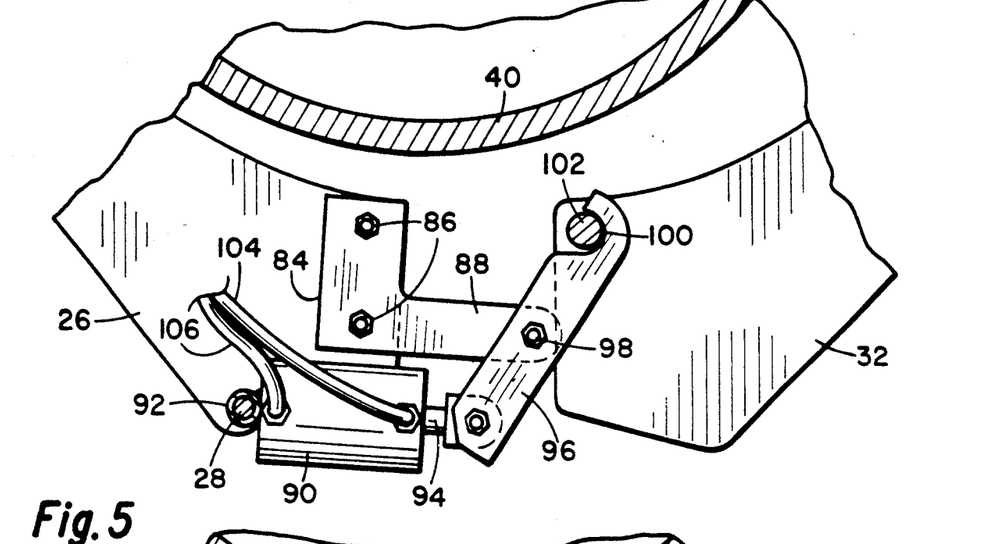
FIG. 5 is a view of the latching means (shown at the bottom of FIG. 2) in its initial condition of engagement.

Assuming that the apparatus is in the open ring position shown in FIGS. 3 and 4, if it is desired to place the device in a locked position around the pipe 40, a yank cord 108 which is attached to the end of the bolt 68 is pulled so that ring section 14 pivots downwardly with respect to the center ring section 12. In fact, the two yank cords 108, one for each locking device 56, are pulled simultaneously so that the two side ring sections 14 and 16 go down at essentially the same time. At this point, the arms 14 and 16 are in a downward position with the hook 100 in a position to engage the rod 102. As shown in FIG. 5, sufficient pressure has been introduced to the line 106 to the cylinder 90 so as to move the arm 96 to provide initial engagement of the notch or hook 100 with the rod 102. By introducing further pressure through the line 106, the arm 96 is pivoted further in a counter-clockwise direction to urge plate 32 towards plate 26 and, hence, ring section 16 towards ring section 14 thus locking the apparatus in position around the pipe as a closed ring. When it is desired to release the apparatus from the pipe, the reverse operation takes place. That is, pressure is introduced into the line 104 to retract the piston and move the arm 96 out of engagement with the rod 102. At this time the two arcuate ring sections 14 and 16 can be lifted upwardly until the plungers 64 engage the holes 54 in the plates 26 and 32 so that the device is in the locked and open ring position shown in FIGS. 3 and 4.

Figure 12:
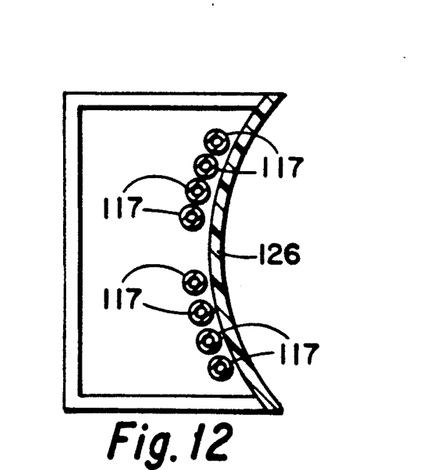
FIG. 12 is a semidiagrammatic sectional view taken along section line 12—12 of FIG. 9.

The sections 14 and 16 are provided with induction heating assemblies which are broadly similar to those shown in Betteridge U.S. Pat. No. 4,595,607, referred to previously. These induction heating assemblies actually more closely resemble the induction heating units shown and described in the aforementioned Hart et al U.S. patent application Ser. No. 07/415,518, previously referred to. The induction heating assemblies of the present application will be broadly referred to by the reference numeral 112. Further details of these induction heating assemblies are shown in FIGS. 9 through 12. One induction heating assembly 112 is mounted on each of the two yoke sections 14 and 16, approximately midway along the arc of each section. Each section is provided with a rectangular box 114 which extends across the yoke portion between the sideplates thereof. A heater support 116 is mounted within each box 114 and is slideably moveable within the box 114 towards and away from the pipe 40 by means of bolts 118 which extend through slots 120 in the sideplates 24, 26, 30 and 32. These bolts pass through suitable slots in the box 114 and also into threaded openings 122 in the heater support 116. By loosening the bolts 118 it is possible to move the heater support 116 towards or away from the pipe 40 because of the slots 120. Within the heater assembly 116 is a coil 117 which is made of copper and which is provided with a cooling medium and induction heating in the same manner as disclosed in Hart et al U.S. patent application Ser. No. 07/415,518, referred to above. The induction coil 117 comprises a length of hollow copper tubing wound in an elliptical pattern a multiple number of times. As best shown in FIG. 12, coil 117 is bowed or curved to correspond to the curvature of the pipe 40. The coils of copper are preferably covered with an insulating fabric (not shown) which can be described broadly as heat treated saturated fiberglass sleeving. This sleeving will insulate adjacent coils from each other.

Figures 9, 10:
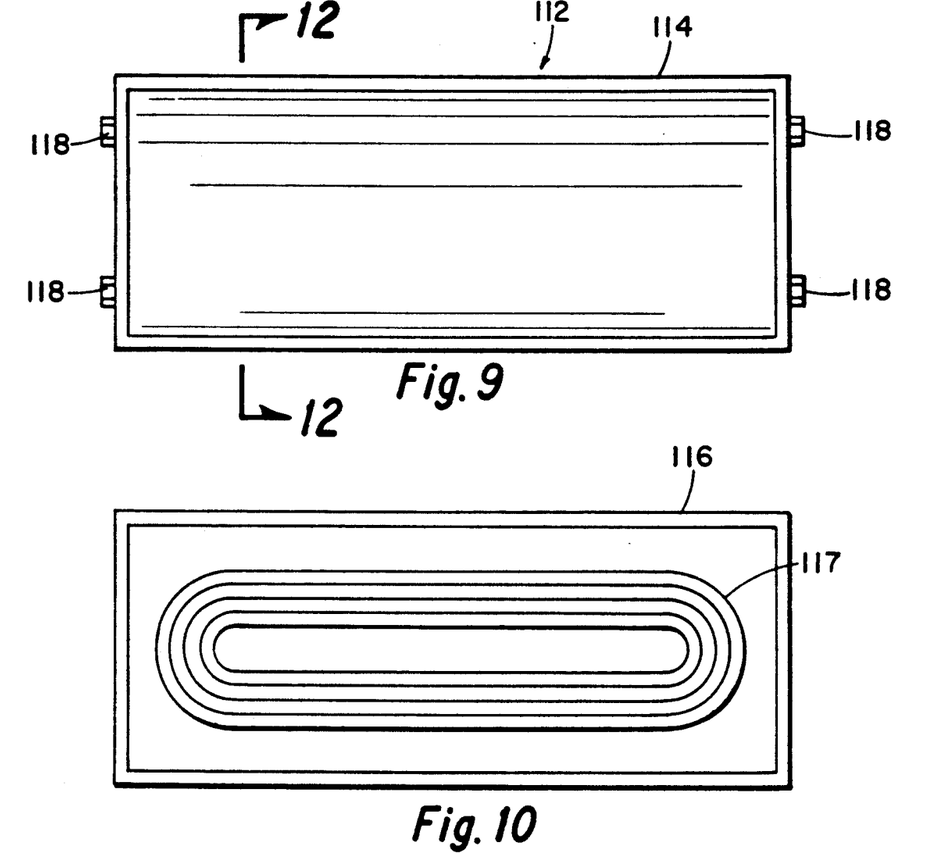
FIG. 9 is an elevation of one of the induction heater assemblies looking along line 9—9 of FIG. 3.
FIG. 10 is a semidiagrammatic view similar to FIG. 9 showing the curved plastic cover removed.
Figure 11:
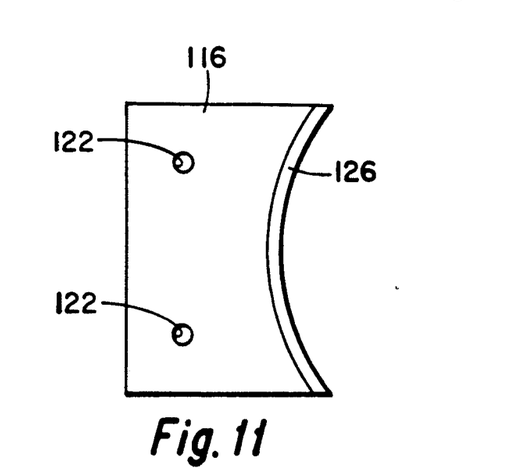
FIG. 11 is an end elevation of the heater assembly shown in FIG. 10.

Although the coils 117 shown in FIG. 10 appear to be planar, they are actually formed in the shape of a curve as best illustrated diagrammatically in FIG. 12. Thus the coil 117 is essentially parallel to the surface of the pipe 40. The entire inner surface of each heat assembly 116 is covered with a curved sheet 126 of plastic material which is manufactured and sold under the trademark "Lexan". The details of the cooling and the method of supplying induction voltage will not be further described herein.

OPERATION

In order to operate the apparatus of the present invention to heat and coat a girth weld, the operator(s) first positions the open ring over the centerline of the weld as shown in FIGS. 3 and 4 of the present application. Next the operator should pull on the yank cords 108 to release the hold-open latches so as to close the ring around the pipe. Thereafter an air switch, which is conveniently located on a console within the reach of the operator, is actuated to operate the pneumatic cylinder 90 to initially engage the rod 102 by the notch or hook 100 as shown in FIG. 5. Further operation of the air switch would close the ring to the position shown in FIG. 6. We will now start the ring rotation and thereafter the induction heating coil will be energized. The ring will be rotated 360 degrees back and forth until the weld area is brought up to the correct temperature. It is understood that cooling material has been introduced into the copper pipes 117 in the manner described in Betteridge U.S. Pat. No. 4,595,607, referred to above. The rate of rotation and the length of time of rotation can be varied. However, if an epoxy coating is to be applied it would be desired to heat the pipe to a temperature of about 450 degrees before applying the epoxy coating. The time required to heat the pipe would generally be about three to five minutes. During the heating, the apparatus is rotated back and forth 360 degrees. When the proper temperature has been reached, the power to the induction heating coil is turned off and the temperature is verified. The rotation of the apparatus again begins and the powder system is turned on. The system is rotated 360 degrees and is reversed to the starting point. The powder system is turned off and the air switch is operated to release the latching mechanism. The ring is opened until the latches engage to hold the apparatus in the position shown in FIGS. 3 and 4 and the apparatus is then rolled to the next weld joint.

Whereas, the present invention has been described in particular relation to the drawings attached hereto, other and further modifications, apart from those shown or suggested herein, may be made within the spirit and scope of this invention.

What is claimed is:

1. A process for heating and coating a weld joint in a pipe comprising placing an open heating and coating ring on the pipe over the center of the weld joint; the heating and coating ring being an articulated yoke adapted to encircle the pipe when the ring is in the closed position and comprising an upper yoke section and two side yoke sections which pivot with respect to the upper yoke section, a pair of releasable locking devices mounted on the upper yoke section for engaging the side yoke sections when the latter are pivoted outwardly away from each other to an open position of the ring thereby locking the side yoke sections in the open position; the upper yoke section having a powder dispensing system mounted thereon for later dispensing a powdered coating material therefrom onto the surface of the pipe; each side yoke section having an induction heating assembly mounted thereon, each induction heater assembly including an induction coil comprising a length of hollow copper tubing wound in an elliptical pattern a multiplicity of times, each said coil being bowed correspondingly to the curvature of said pipe; actuating the releasable locking devices to unlock the side yoke sections with espect to the upper yoke section whereby the side yoke sections pivot in relation to the upper yoke section so as to closely surround the pipe; urging the lower ends of the side yoke sections towards each other to a closed position of the ring and locking the lower ends of the side yoke sections in this closed position, whereby the induction coils are disposed in a cylindrical surface adjacent to, and parallel with, the surface of the pipe; rotating the closed ring around the pipe; applying an alternating electric potential to the induction coils to heat the pipe to an application temperature for the coating material; continuing to rotate the closed ring alternately in opposite rotary directions while heating the pipe until the application temperature is reached; interrupting the supply of electrical petential to the induction coils; and thereafter applying a coating material through the dispenser to the thus-heated pipe while continuing to rotate the assembly.

* * * * *